United States Patent [19]

Kaiser et al.

[11] 4,207,184
[45] Jun. 10, 1980

[54] PROCESS FOR THE PURIFICATION OF INDUSTRIAL EFFLUENTS

[75] Inventors: Leo E. Kaiser, Allschwil; Hans Scheidegger, Binningen; Jaroslav Haase, Riehen, all of Switzerland

[73] Assignee: Ciba-Geigy Aktiengesellschaft, Basel, Switzerland

[21] Appl. No.: 924,782

[22] Filed: Jul. 14, 1978

Related U.S. Application Data

[63] Continuation-in-part of Ser. No. 694,615, Jun. 10, 1976, abandoned.

[30] Foreign Application Priority Data

Jun. 17, 1975 [CH] Switzerland ............. 7846/75

[51] Int. Cl.² ................................. C02C 5/02
[52] U.S. Cl. ........................... 210/37 R; 210/38 R; 210/40

[58] Field of Search ............... 8/177 R; 210/24, 38 R, 210/40, 37 R; 260/29.6 AN; 264/78, 182

[56] References Cited

U.S. PATENT DOCUMENTS

| 3,111,357 | 11/1963 | Wirth et al. | 264/182 |
|---|---|---|---|
| 3,716,483 | 2/1973 | Renner | 210/40 |
| 3,829,380 | 8/1974 | Oohara | 210/40 |

Primary Examiner—Benoît Castel
Assistant Examiner—Ivars Cintin
Attorney, Agent, or Firm—Sprung, Felfe, Horn, Lynch & Kramer

[57] ABSTRACT

A process for purifying industrial effluents, wherein said effluents are brought into contact with a polymer adsorption material which is in the form of a solvated, preferably hydrated, gel.

21 Claims, No Drawings

PROCESS FOR THE PURIFICATION OF INDUSTRIAL EFFLUENTS

CROSS REFERENCE TO RELATED APPLICATION

This application is a continuation-in-part of our patent application serial No. 694,615, filed on June 10, 1976, now abandoned.

The present invention provides a new process for the purification of industrial effluents, in particular the decolourisation of waste water occurring in the textile, fibre, paper, and leather industry, and in the manufacture of fluorescent brighteners and dyes, for example, residual liquors, mother liquors, rinsing and wash waters.

One of the great environmental problems in industrialised areas is the pollution of rivers and lakes. Because the pollution can also originate from industrial plants, the purification of industrial effluents is gaining increasing importance at the present time. However, this effluent purification is proving to be exceedingly difficult, especially whenever it is a matter of eliminating organic substances of limited biodegradability which are dissolved in water. Within this nexus of problems there is consequently an urgent need for the decolourisation and purification of effluents which occur in the dyestuff, fibre, textile, paper, and leather industry.

Different processes have already been proposed for the purification of strongly coloured and polluted effluents that occur for example in the manufacture and use of dyes and dyeing assistants. It is known, for example, to collect coloured effluent or wash waters in large tanks and to precipitate the dyestuff and assistant residues by addition of suitable flocculants and to separate them by sedimentation, flotation or filtration. However, these processes create problems, because the quantities of water to be treated are large and the sedimentation or the separation of the flocks from the purified water involves the use of complicated apparatus.

It is also known to use activated charcoal for purifying, especially for decolourising, industrial effluents. The use, for example, of granulated activated charcoal often proves to be not very suitable, since the capacity of the activated charcoal for absorbing organic dyes dissolved in water and impurities present in effluent is too small.

From U.S. Pat. No. 3,716,483 it is also known that industrial effluents can also be purified with the aid of highly disperse organic polymers which are in the dry state. However, the drawback of this process is that, for example, the removal of anionic dyes from aqueous liquors in a satisfactory amount is only possible at elevated temperatures and relatively low pH values.

Surprisingly, it has now been found that a rapid and ample purification of industrial effluents is attained by bringing them into contact with a polymeric adsorption material in the form of a solvated, preferably hydrated, gel. Compared with the corresponding non-solvated and non-hydrated materials, this polymer gel adsorption material is characterised by an increased capacity for adsorbing substances that are dissolved or dispersed in water and by an increased rate of adsorption.

The adsorption material to be used according to the present invention is suitable above all for purifying liquors containing ionic, i.e. anionic or cationic, substances and mixtures thereof, in particular for removing anionic or cationic dyes, fluorescent brighteners, dyeing or textile assistants, surfactants, tannins, or mixtures thereof.

With the aid of the adsorptive polymer gels it is possible not only to remove the previously mentioned substances from incompletely exhausted dye, brightener and treatment liquors, but also to purify to a satisfactory extent the corresponding residual liquors that contain non-ionogenic textile or dyeing assistants and/or non-ionic dyes or fluorescent brighteners and also liquors which are diluted by rinsing waste waters and normally contain mixtures of dyes and detergents.

On account of the broad applicability of the adsorption material used in this invention, it is possible to meet the nowadays ever more urgent demand for saving fresh water by a partial to complete recirculation of residual or waste liquors. Independently of the apparatus used, these are principally the effluents of the dyestuff, fibre manufacturing, textile, paper, and leather industry, which occur in connection with dyeing, washing and tanning processes. In the case of a dyeworks, these effluents can originate from the conventional dyeing machines used for the dyeing of loose fibrous material, tops, yarn, and woven and knitted fabrics, and also from rinsing machines, e.g. an open-width washer.

The purification of the effluents is advantageously carried out at 0° to 130° C. Preferably, however, it is effected at temperatures between 0° to 100° C., in particular between 10° and 70° C. If desired, the effluents can also be purified under pressure or in vacuo. The pH of the liquor can vary within wide limites, for example between 2 and 12. Depending on the nature of the polymer used as adsorption material, pH adjustments, for example to a value of 2 to 7, in particular of 3 to 5, can simplify and speed up the purification process.

The process of the present invention can be carried out discontinuously, semi-continuously or continuously, the last two alternatives being preferred. In principle, the following three processes are suitable within the scope of the invention:

(a) the stirring process, in which the water to be purified is stirred in a vessel with the adsorption agent and then the two are separated;

(b) the fluid bed process, in which the adsorption agent is kept in suspension through the flow of the liquor to be purified;

(c) the solid bed process, in which the liquor subject to purification is conducted through a filter-like adsorption material.

If the last of these three process possibilities, the solid bed process (c), is applied, then the following three alternatives with respect to the apparatus employed are chiefly suitable:

1. The treatment apparatus, e.g. dyeing appliance, is firmly connected to the filter device.
2. The adsorber device is movable and can be coupled as required with any treatment apparatus.
3. The effluents originating from the treatment apparatus are combined in a suitable container and then jointly conveyed through the adsorption material.

Within the scope of the invention, suitable polymer gel adsorption materials can be both natural and regenerated or synthetic man-made polymers. Preferably they are synthetic plastics which are non-ionogenic or contain in particular groups which form ionogenic salts in water, such as anionic water-solubilising groups, for example sulphonic acid, carboxylic acid or phosphonic acid groups, or onium groups, for example ammonium, sulphonium or phosphonium groups. The suitable polymers will usually have an average molecular weight greater than 500 and a specific surface area greater than 30, in particular 80 to 250 m$^2$/g.

The polymer gel concentration depends normally on the nature and concentration of the substances to be removed and is usually 0.1 to 50 g/l, referred to the solids content of the adsorption material. The polymers used as adsorption materials are microporous gels in a state of primary swelling, by which is meant the amount of liquid, for example of water or organic solvents, which cannot be removed for example from a swollen fibre by conventional mechanical means, for example centrifuging. This gel state is characterised in particular in that the specific surface areas of the polymer material falls to values below 5 m$^2$/g of dry polymer when it is dried by conventional means and the material loses its high absorbtive capacity in the process. Drying by conventional means is to be understood in this context as meaning that the swelling liquid is removed at temperatures above its solidification point by evaporation or volatilisation. The minimum residual moisture which is necessary for maintaining the gel state is as a rule between 5 and 25%, referred to the dry polymer material.

Also included within the scope of the present invention are dehydrated polymer gels which are prepared, for example, by lyophilisation or solvent exchange drying while retaining a large specific surface area.

The gel state is achieved, for example, by dissolving the polymer, if appropriate at elevated temperature, in a water-miscible inorganic solvent, for example aqueous nitric acid, sulphuric acid or sodium thiocyanate solution, and adding the polymer solution to a suitable coagulating liquid, preferably water, or also ethanol, which is miscible with the polymer solvent but is itself not a solvent for the polymer and solvates the polymer. In certain cases, however, the polymer gels can also be obtained direct in the formation of the polymers.

Examples of water-miscible organic solvents for preparing the polymer solution are: dimethyl formamide, diethyl formamide, dimethyl acetamide, ethylene carbonate, dimethyl sulphoxide, γ-butyrolactone, tetrahydrofuran, acetone, dioxan, methanol, ethanol, propanol, isopropanol, butanol and thioglycolic acid.

The polymer solution can be coagulated direct or separately in the effluent medium. In the latter case, the polymer gel is preferably freed from solvent and coagulating agent and then brought into contact with the effluent.

The gel state can also be obtained by spray coagulation, whereby a fine spray of the polymer solution is added to a fine spray of coagulating liquid. The coagulating liquid can also be in vapour form. A further possibility of achieving the gel state consists in atomising the polymer solution within the coagulating liquor.

The plastics which can be converted into the required gel state can belong to a wide variety of known classes of regenerated man-made and synthetic man-made polymers. Suitable examples are polycondensates, polymers and polyadducts, which can be both thermosetting plastics and thermoplastics. Suitable regenerated man-made plastics are, for example, cellulose esters, such as cellulose nitrate, cellulose acetate, cellulose triacetate, cellulose acetobutyrate, cellulose propionate, cellulose ethers, such as methyl cellulose, ethyl cellulose and benzyl cellulose, and also starch derivatives, for example acetyl starch. Advantageously they are synthetic man-made thermoplastics which can be used as filament cable, fibre webs, fibre waste, sponges, loose fibres, slivers or wads, as well as beads, granulates or amorphous particles.

Examples of suitable thermoplastics are: polyacrylonitrile, polyamide, linear polyesters, for example polyethylene terephthalate, polyolefins, for example aluminium-modified polypropylene, polystyrene and polyurethanes.

According to the present invention, synthetic fibres which are obtained for example, in wet spinning processes are used as adsorption material for purifying dilute dye-containing effluents, in particular effluents which are polluted by cationic and/or anionic dyes.

These wet spun fibres can be unstretched, partially stretched or fully stretched, and are freed from spinning bath chemicals by rinsing treatments.

Particularly suitable adsorption materials are synthetic fibre materials in the gel state the individual fibres of which have a titre of 0.2 to 20 denier, preferably of 0.5 to 5 denier.

Materials with a very satisfactory adsorptivity are comminuted, for example cut or broken, spinning cables in the moist gel state, with, for example fibre lengths of 1 to 100 mm, preferably 1 to 10 mm. If desired, the spinning cables can be further refined by grinding.

As preferred synthetic organic fibrous materials which can be used according to the present invention in the gel state there may be mentioned: synthetic polyamides, in particular those obtained from adipic acid and hexamethylenediamine, from ε-caprolactam or from ω-aminoundecanoic acid; anionically modified polyamides, such as polycondensation products of 4,4'-diamino-2,2'-diphenyldisulphonic acid or 4,4'-diamino-2,2'-diphenylalkanedisulphonic acid with polyamide-forming starting materials; polycondensation products of monoaminocarboxylic acids and the amide-forming derivatives thereof or of dibasic carboxylic acids and diamines with aromatic dicarboxysulphonic acids, for example condensation products of ε-caprolactam or hexamethylenediammonium adipate and potassium-3,5-dicarboxybenzenesulphonate; cellulose ester fibres, such as cellulose 2½-acetate or cellulose triacetate fibres; linear polyester fibres, for example those obtained by condensing terephthalic acid with ethylene glycol or isophthalic acid or terephthalic acid with 1,4-bis-(hydroxymethyl)-cyclohexane, and copolymers of terephthalic and isophthalic acid and ethylene glycol; acid-modified polyester fibres, such as polycondensation products of aromatic polycarboxylic acids, for example terephthalic acid or isophthalic acid, with polyvalent alcohols, for example ethylene glycol, and 1,2- or 1,3-dihydroxy-3-(3-sodium sulphopropoxy)-propane, 2,3-dimethylol-(3-sodium sulphopropoxy)-butane, 2,2-bis-(3-sodium sulphopropoxyphenyl)-propane or 3,5-dicarboxybenzene-sulphonic acid or sulphonated terephthalic acid, sulphonated 4-methoxy-benzenecarboxylic acid or sulphonated diphenyl-4,4' -dicarboxylic acid; polymeric or copolymeric acrylonitrile materials, the copolymers containing as a rule at least 50% of acrylonitrile. Other vinyl compounds, for example vinylidene chloride, vinylidene cyanide, vinyl chloride, methacrylates, methyl vinyl pyridine, N-vinyl pyrrolidone, vinyl acetate, vinyl alcohol, acrylic amide, acrylic acid, vinyl- or styrenesulphonic acid, are also used as comonomers besides the acrylonitrile.

The adsorptivity of the cited polymer gels can be regulated by the choice of the monomers or comonomers required for obtaining them and increased by adding suitable additives to the polymer solution, for example open-chain or cyclic, polymerised or unpolymerised amines or ammonium salts. These additives are able not only to increase the adsorption properties, but also the solvation and hydration capacity of the polymer gel.

If the polymer material is one that is obtained by a process commonly employed for manufacturing textile fibre cable, then the fibre-like material need not have a high strength or homogeneity. Consequently the comonomers and/or spinning solution additives can be much more freely chosen than in the manufacture of textile fibres which must meet the demands made of them in respect of textile technology.

If the material is spinning cable which is also, or especially, manufactured for textile use, the field in which these materials can be used in the hydrated gel state is widened.

Possible dyes which can be removed from the effluents with the adsorption material according to the invention are anionic or cationic dyes that are both soluble and dispersible in water, fluorescent brighteners. The adsorption material is preferably used for removing water-soluble, in particular cationic and anionic, dyes or fluorescent brighteners.

The anionic dyes which are removed according to the invention are dyes whose anionic character is dependent on metal complex formation alone and/or on the acid substituents which effect the water-solubility. Suitable acid substituents which effect the water-solubility are carboxylic acid groups, phosphoric acid groups, acylated sulphonic acid imide groups, such as alkyl- or arylidisulphimide groups or alkyl- or arylcarbonylsulphimide groups, alkyl- or arylimide groups, sulphuric acid (half) ester and above all sulphonic acid groups.

The anionic dyes can belong to the most widely different classes of dye. As examples there may be mentioned oxazine, triphenylmethane, xanthene, nitro, acridone, stilbene, perinone, naphthoquinone-imine, phthalocyanine, anthraquinone and azo dyes. These last mentioned dyes can be metal free, metallisable or metalliferous monoazo, disazo and polyazo dyes, including formazane dyes, in which the metal atom forms a 1:1 or 1:2 complex, especially 1:2 chromium or 1:2 cobalt complexes which contain two similar or two different molecules of azo dye complexed to a chromium or a cobalt atom. These dyes can also contain in the molecule reactive groups, i.e. groups which form a covalent bond with the fibrous material to be dyed.

The cationic dyes that can be removed from the effluents with the aid of the polymer gel are as a general rule the customary salts and metal halides, for example zinc chloride double salts, of the known cationic dyes the cationic character of which derives from a carbonium, an oxonium, a sulphonium and, above all, an ammonium group. Examples of such chromophoric systems are: methine, azomethine, azo, hydrazone, azine, oxazine, thiazine, diazine, xanthene, acridine, polyarylmethane, such as diphenylmethane or triphenylmethane, and also cumarin and azo dyes which contain an indolinium, pyrazolium, triazolium, tetrazolium, oxadiazolium, thiadiazolium, oxazolium, thiazolium, pyridinium, pyrimidinium or pyrazinium ring. They can also be arylazo, phthalocyanin and anthraquinone dyes which carry, for example, an external cycloammonium or alkylammonium group.

The process of this invention is suitable not only for decolourising residual liquors occurring in the dyestuffs, textile, fibre, paper, and leather industry, but furthermore is also most useful when it is a matter of eliminating residues of anionic or cationic fluorescent brighteners from wash and bleach liquors.

The fluorescent brighteners can belong to any class of brightener compounds. The anionic brighteners are in particular stilbene compounds, cumarins, benzocumarins, pyrazines, pyrazolines, oxazines, dibenzoxazolyl or dibenzimidazolyl compounds or naphthalic imides which contain in the molecule at least one acid group, for example a carboxylic acid or preferably a sulphonic acid group, and which can be fibre reactive. The cationic brighteners are primarily those of the methine, azomethine, benzofuran, benzimidazolyl, cumarin, naphthalimide or pyrazoline class.

The water-insoluble, non-ionic dyes which can also be removed according to the invention include disperse dyes, vat dyes, sulphur dyes, water-insoluble fluorescent brighteners and organic and inorganic pigments.

A further advantage of the adsorption material according to the invention is that, besides the dyes, it permits also a partial elimination of non-ionic, anionic and cationic surfactants and textile and dyeing assistants from aqueous waste liquors. Such assistants are described in more detail in "Tenside-Textilhilfsmittel-Waschrohstoffe" by Dr. Kurt Lidner (published by Wissenschaftliche Verlagsgesellschaft Stuttgart, 1964).

The adsorption agent can also be effective in the elimination of anionic synthetic tannins, especially tannins that carry one or more sulpho groups in the molecule. A more detailed description of these compounds can be found e.g. in "Ullmans Encyclopädie der technischen Chemie", Vol. 11, pp. 595-598.

Appropriate choice of the adsorption material makes it possible to extract up to 100% of the impurities from the effluents. Retardant effects of up to 50 g of waste matter, i.e. dye, fluorescent brightener, assistant, detergent, tannin, per 100 g of adsorption material can be achieved. Preferably a waste water effluent is decolourised which has a dye concentration of 0.05 to 0.5 g/l as indicated in the most part of the Examples.

Whenever a complete decolourisation or removal of the waste substances cannot be accomplished by a single treatment of the waste liquor with the adsorption material, it is advisable to repeat the cleansing procedure. The amount of adsorption material used can be reduced to a minimum by means of a recirculation.

The treatment according to the invention of the polluted liquid media with the polymer gels can optionally also be only part of a purification or recovery process. The preparation of drinking water and also certain effluent treatments can be effected over a number of steps in one of which the cited polymer gels can be used as adsorbent.

After the adsorption of the impurities, the adsorption capacity of the polymer gels can be partially or completely recovered, for example by extraction with suitable solvents.

The invention is illustrated by the following Examples in which the parts and percentages are by weight.

EXAMPLE 1

With good stirring, 5 liters of a warm (32° C.) green coloured liquor which contains 0.2 g/l of a dye of the formula 0.05 g/l of a dye of the formula

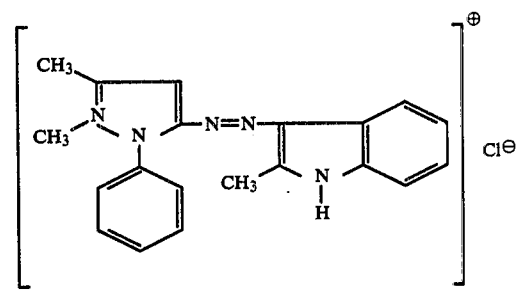

0.1 g/l of a dye of the formula

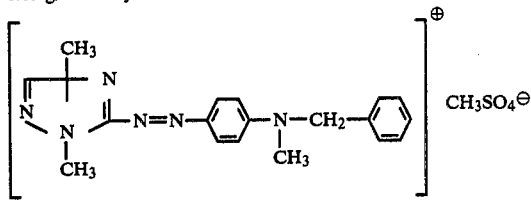

1 g/l of a dyeing assistant of the formula

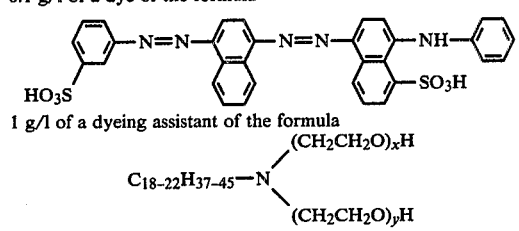

(x + y = 35)

and 1 g/l of 80% acetic acid, 2 g/l of sodium sulphate solution and 1.5 g/l of sodium acetate solution, are treated for 3 minutes with 12 g (referred to the solids content) of a polymer gel prepared from a polyamide 66 ultra-deep dyeing type (Du Pont Nylon 848). The polymer gel, which has been obtained by dissolving the polymer in formic acid and coagulating the solution in a mixture of water and formic acid (1:1), has a specific surface area of 165 $m^2/g$, determined by the BET method. After separation of the adsorber material by filtration, the liquor is completely decolourised.

EXAMPLE 2

A polyacrylonitrile cable which has been wet spun from dimethyl formamide and consists of filaments of 3 denier individual titre, is cut in the hydrated state and comminuted to an average length of 1 mm. The material has a specific surface area of 210 $m^2/g$, determined by the BET method. 5.4 g of this fibre pulp, which corresponds to 2 g of the dry polyacrylonitrile, are stirred at room temperature into 1.5 liters of an aqueous liquor which contains 0.5 g/l of a dye of the formula

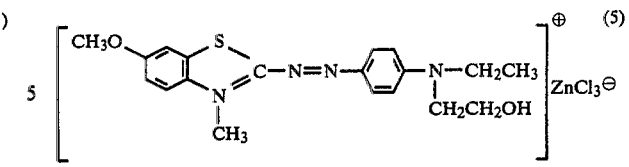

After a contact time of 2 minutes the liquor is separated from the polyacrylonitrile fibre pulp by filtration. After this treatment the liquor still contains only 0.1 g/l of the above dye.

The same result is obtained by carrying out the treatment of the liquor at 40° or 80° C.

EXAMPLE 3

A glass tube of 20 mm internal diameter is filled with 75 g of a polyacrylonitrile cable spun from an aqueous sodium thiocyanate solution. The hydrated piece of cable corresponds to 30 g of dry fibre material. Its specific surface area is 195 $m^2/g$, determined by the BET method. An aqueous liquor of 35° C., which contains 5 g/l of the blue dye of formula (5), is then passed through this adsorption column from underneath. The adsorber column turns blue in colour, whereas the liquor passing through it is completely decolourised. During the passage of the liquor, the adsorption capacity of the adsorber is 120% of dye, referred to dry polyacrylonitrile.

EXAMPLE 4

One arm of a U-shaped tube is continuously and uniformly packed with hydrated polyacrylonitrile spinning cable (specific surface area 125 $m^2/g$). The cable packing is pushed constantly through the tube and drawn out at the other arm of the tube. A warm liquor of 50° C., which contains 0.12 g/l of a blue dye of the formula (5), is passed in counter-current at a contact time of 15 seconds through the adsorption material. The treated liquor that flows out is completely colourless. Adsorption capacity of the adsorber: 21% of dye.

EXAMPLE 5

Four agitator vessels, arranged in the corners of a square and connected by piping, are each charged with 20 liters of water and 1 kg of the polyacrylonitrile fibre pulp described in Example 2. An orange coloured warm dyeworks effluent of 55° C., which contains 0.03 g/l of a dye of the formula

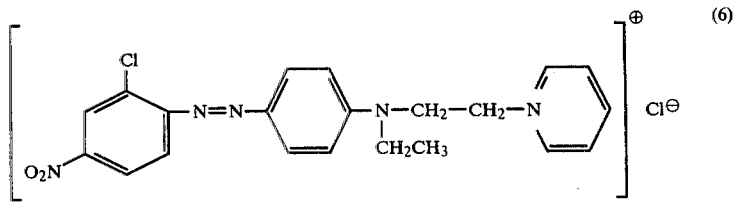

and 0.02 g/l of a commercial disperse dye consisting of 42% of a dye of the formula

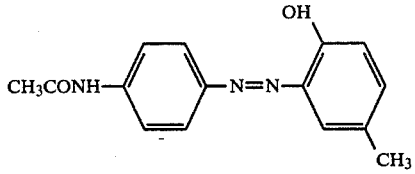

(7)

15% of sulphite lye and 43% of a naphthalenesulphonic acid, is then passed through 3 of the 4 series-connected agitator vessels. The average dwell time of the liquor is 10 seconds per agitator vessel. The liquor flows first from vessel I to II and from there to III and finally into a receiver vessel. As soon as the liquor no longer emerges colourless from the third agitator vessel, the fourth one, which contains fresh adsorption material, is connected to the third, so that the liquor is again completely decolourised. The adsorption capacity of the adsorber of vessel I is 33% of dye.

EXAMPLE 6

100 liters of a greyish-blue effluent with a pH of 10.6 and a TOC content of 67 mg/l and with 2.77 g/l of dissolved solids containing 14 percent by weight of a reactive dye, are passed at room temperature and a contact time of 20 seconds per unit of weight of adsorption material through a cleansing column which is charged with 600 g (referred to the solids content) of a polymer gel (specific surface area: 165 $m^2/g$) prepared from polyamide 66 of the ultra-deep dyeing type (Du Pont nylon 848). After it has passed through the column, the liquor is colourless and has a TOC content of only 32 mg/l. TOC=Total organic carbon.

EXAMPLE 7

100 g of a copolymer of 92% of acrylonitrile and 8% of vinyl acetate are dissolved in 900 g of dimethyl formamide. Then 200 g of this polymer solution are added, as a thin jet, through a hollow needle with an internal diameter of 0.6 mm to 2 liters of cold water, which is stirred vigorously in an impeller mixer. A polymer gel with a principal particle size of 0.05 to 0.2 mm is obtained; it is separated from water by filtration. The polymer gel has a specific surface area of 102 $m^2/g$, determined by the BET method.

3 g of this adsorption material, containing 0.51 g of dry polyacrylonitrile, are added to 0.5 liters of a liquor of 20° C., which contains 0.12 g/l of a blue dye of the formula (5). After stirring vigorously for 2 minutes and separation of the adsorber, the liquor still contains only 0.045 g/l of the dye.

By using the polymer gels listed in column 2 of the following table instead of the adsorption material used in this Example, and otherwise carrying out the procedure in similar manner as described above, the liquor described in column 3 can be decolourised at the temperatures indicated in column 4. Column 5 indicates the decolourising time in minutes, column 6 the residual dye concentration, and column 7 the percentage adsorption capacity.

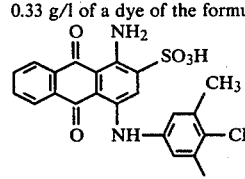

| 1 Ex. | 2 Polymer gel | 3 Liquor containing | 4 °C. | 5 time in min. | 6 g/l | 7 % |
|---|---|---|---|---|---|---|
| 8 | 9 parts of the copolymer of 92% of acrylonitrile 8% of vinyl acetate 1 part of the copolymer of 75% of acrylic acid 20% of acrylonitrile 5% of acrylic amide spec. surface area: 180 $m^2/g$ | 0.24 g/l of a dye of the formula (5) | 20 | 2 | 0 | |
| 9 | copolymer of 92% of acrylonitrile 8% of vinyl acetate spec. surface area: 135 $m^2/g$ | 0.33 g/l of a dye of the formula (8) | 20 | 2 | 0.31 | 3 |
| 10 | 8 parts of the copolymer of 92% of acrylonitrile 8% of vinyl acetate 2 parts of N,N-dimethyl-dodecylamine spec. surface area: 155 $m^2/g$ | 0.33 g/l of a dye of the formula (8) | 20 | 2 | 0.08* | 38* |
| 11 | " | 0.3 g/l of a dye of the formula (5) | 25 | 2 | 0.13 | 28 |
| 12 | 9 parts of the copolymer of 92% of acrylonitrile 8% of acrylonitrile 1 part of the copolymer of 75% of acrylic acid 20% of acrylonitrile 5% of acrylic amide spec. surface area: 180 $m^2/g$ | 0.24 g/l of the dye of the formula (5) 0.05 g/l of a condensation product of N,N-dimethyl-lauryl amine and epichlorohydrin | 20 | 2 | 0 | |
| 13 | " | 0.5 g/l of N-(2-ethyl-2-phenyl)-ethyl-pyridinium chloride | 30 | 2 | 0.07 | |
| 14 | basically modified polyacrylonitrile (Acrilan B 49) spec. surface area: 85 $m^2/g$ | 3.5 g/l of a dye of the formula (8) | 75 | 1 | 0.4 | 42 |
| 15 | " | " | 20 | 2 | 0.4 | 42 |
| 16 | basically dyeable polyamide | 0.1 g/l of a dye of the formula (9) | 45 | 2 | 0 | 42 |

-continued

| Ex. | Polymer gel | Liquor containing | °C. | time in min. | g/l | % |
|---|---|---|---|---|---|---|
| | (DuPont nylon 844) spec. surface area: 110 m²/g | 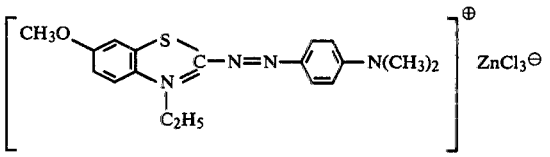 | | | | |
| 17 | polyamide 66 (Du Pont nylon 848) spec. surface area: 165 m²/g | 3 g/l of a dye of the formula (10) 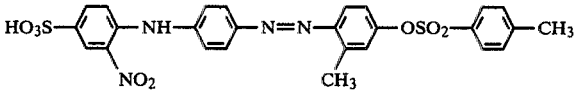 1 g/l of a dye of the formula (11) 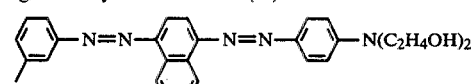 | 20 | 2 | 0.2 | 28 |
| 18 | cellulose 2½acetate spec. surface area: 35 m²/g | 0.05 g/l of a dye of the formula (5) | 32 | 2 | 0 | 7 |
| 19 | fibre pulp of hydrated polyacrylonitrile spec. surface area: 210 m²/g | 0.05 g/l of a fluorescent brightener of the formula (12) 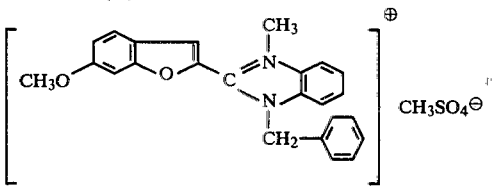 | 20 | 2 | 0 | |
| 20 | viscose spec. surface area: 38 m²/g | 0.9 g/l of a dye of the formula (13) 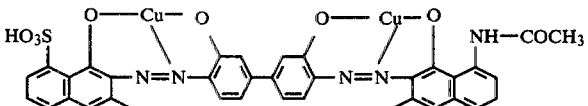 | 40 | 1 | 0.2 | 11 |
| 21 | basically dyeable polyester (Darcron 64) spec. surface area: 55 m²/g | 0.07 g/l of a dye of the formula (1) 0.01 g/l of a dye of the formula (14) 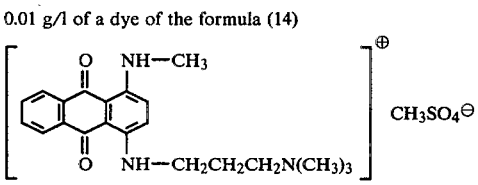 | 20 | 1 | 0 | 45 |

*In comparison with Example 9 shows the improved adsorber action through the addition of the amine in the preparation of the polymer.

EXAMPLE 22

9 parts of copolymer of 92% of acrylonitrile and 8% of vinyl acetate are dissolved together with 1 part of primary octadecylamine in 60 parts of dimethyl acetamide.

300 g of this polymer solution are sprayed with air from a spray gun under water at room temperature, to give a fibrous polymer gel with an average particle size of 0.02 to 0.15 mm, which is separated by filtration from water or a mixture of water/dimethyl acetamide, and rinsed with warm water of 40° C. The specific surface area of the polymer gel is 153 m²/g, determined by the BET method.

5 g of this adsorption material, containing 1.6 g of the dry copolymer, are added to 1 liter of a liquor of 25° C., which contains 0.5 g of the blue direct dye of the formula

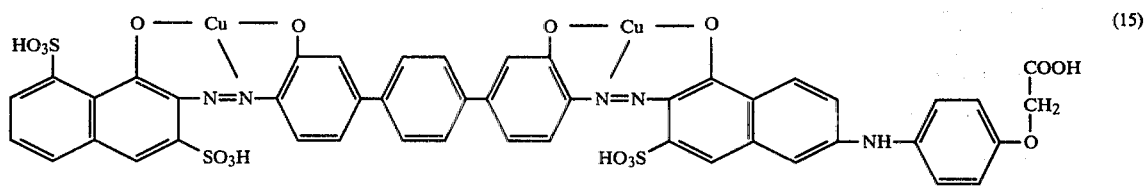
(15)

After stirring vigorously for 5 minutes and separating off the adsorber, the liquor still contains only 0.06 g/l of dye. The adsorber has an adsorption capacity of 27.5% of dye, referred to the dry adsorption material.

EXAMPLE 23

300 g of the polymer solution of Example 22 are atomised at room temperature with air from a spray gun. The spray is directed at an acute angle towards the spray from a second spray gun from which water of room temperature is atomised. When both sprays come in contact, the polymer coagulates in very fine, amorphous form. The coagulate is collected in a glass tube, rinsed with warm water of 40° C. and filtered off, to yield a polymer gel with an average particle size of 0.01 to 0.1 mm. The specific surface area of the polymer gel is 185 $m^2/g$, determined by the BET method. In the same decolourising liquor as described in Example 22, a liquor is obtained which still contains only traces of dye. The adsorption capacity of the adsorber is 31.3% of dye, referred to the dry adsorption material.

A similar result is obtained by atomising the polymer solution in contact with steam instead of a water spray.

What is claimed is:

1. A process for the purification and decolorization of an industrial waste water effluent which comprises contacting said effluent, having a dye concentration of 0.05 to 0.5 g/l, with a polymer adsorption solvated gel material having an average molecular weight greater than 500 and a specific surface area greater than 30 $m^2/g$. and said material being a synthetic man-made thermoplastic in the solvated gel state.

2. A process according to claim 1, wherein the effluent is a polluted waste liquor which occurs in the textile, fibre, paper or leather industry or in the manufacture of dyes or fluorescent brighteners.

3. A process according to claim 1, wherein the effluent is a waste liquor which contains anionic or cationic substances or mixtures thereof.

4. A process according to claim 1, wherein the effluent contains anionic or cationic dyes, fluorescent brighteners, textile or dyeing assistants, sufactants, tannins, or mixtures of such substances.

5. A process according to claim 1, wherein the effluent contains mixtures of anionic or cationic dyes with anionic, cationic or non-ionogenic assistants or non-ionogenic dyes.

6. A process according to claim 1, wherein the purification is carried out by a solid bed process.

7. A process according to claim 1, wherein the purification of the effluents is carried out at 0° to 100° C.

8. A process according to claim 7, wherein the purification of the effluents is carried out at a temperature between 10° and 70° C.

9. A process according to claim 1, wherein the adsorption material is in a hydrated gel state.

10. A process according to claim 1, wherein the polymer gels are synthetic fibres obtained by wet spinning processes.

11. A process according to claim 10, wherein said material consists of synthetic polyamides, anionically modified polyamides, polymeric or copolymeric acrylonitrile, cellulose esters, linear polyesters or acid modified polyester fibres in the solvated gel state.

12. A process according to claim 11, wherein said material is a polymeric or copolymeric acrylonitrile in the solvated gel state.

13. A process according to claim 11, wherein said material is synthetic polyamide in the solvated gel state.

14. A process according to claim 10, wherein the fibres have an individual titre of 0.2 to 20 denier.

15. A process according to claim 10, wherein the polymer gels are used in the form of spinning cable.

16. A process according to claim 10, wherein the polymer gels are polymeric or copolymeric acrylonitrile spinning cable in the hydrated gel state.

17. A process according to claim 1, wherein the polymer gels are used in comminuted form.

18. A process according to claim 1, wherein the polymer gels are used in the form of cut or broken spinning cable in fibre lengths of 1 to 10 mm.

19. A process according to claim 1, wherein the polymer gels are used in the form of ground fibres.

20. A process according to claim 1, wherein the polymer gels are used as fibre webs.

21. A process according to claim 1, wherein the polymer gels are used as amorphous particles.

* * * * *